United States Patent
Delabastita et al.

(10) Patent No.: US 6,278,802 B1
(45) Date of Patent: Aug. 21, 2001

(54) FREQUENCY-MODULATION HALFTONE SCREEN AND METHOD FOR MAKING SAME

(75) Inventors: Paul A. Delabastita, Antwerp; Frank A. Deschuytere, Beveren, both of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 08/950,468

(22) Filed: Oct. 15, 1997

Related U.S. Application Data (63) Continuation of application No. 08/493,740, filed on Jun. 22, 1995, now abandoned, which is a continuation of application No. 08/116,254, filed on Sep. 2, 1993, now abandoned.

(51) Int. Cl.[7] .................................................. G06K 9/36
(52) U.S. Cl. ........................... 382/251; 382/299; 358/1.2
(58) Field of Search .................... 382/232, 251, 382/252, 253, 299; 358/456–460, 1.2, 1.9; 395/108

(56) References Cited

U.S. PATENT DOCUMENTS

| | | | |
|---|---|---|---|
| 4,004,079 | * | 1/1977 | Boston ................................ 358/256 |
| 4,447,833 | * | 5/1984 | Sano et al. ........................... 358/460 |
| 4,485,397 | * | 11/1984 | Scheuter et al. .................... 358/456 |
| 5,041,920 | * | 8/1991 | Hayes et al. ........................ 358/456 |
| 5,105,280 | * | 4/1992 | Ogino et al. ........................ 358/459 |
| 5,111,310 | * | 5/1992 | Parker et al. ....................... 358/457 |
| 5,291,311 | * | 3/1994 | Miller .................................. 358/456 |
| 5,438,431 | * | 8/1995 | Ostromoukhov ................... 358/457 |

* cited by examiner

Primary Examiner—Jon Chang
Assistant Examiner—Larry J. Prikockis
(74) Attorney, Agent, or Firm—Schmeiser, Olsen & Watts (57) ABSTRACT

A frequency-modulation halftone screen and method that enable the use of relatively large frequency-modulation halftone dots, which have desirable reprographic characteristics, in combination with high resolution rendering of text, graphics, and boundary information in general.

2 Claims, 11 Drawing Sheets

(  = GAIN)

FIG. 7A
PRIOR ART

(  = GAIN)

FREQUENCY-MODULATION HALFTONE SCREEN AND METHOD FOR MAKING SAME

This application is a continuation of application Ser. No. 08/493,740 filed on Jun. 22, 1995, now abandoned, which is a continuation of application Ser. No. 08/116,254 filed on Sep. 2, 1993 now abandoned.

BACKGROUND OF THE INVENTION

Many reproduction methods are only capable of reproducing a small number of stable image tones. For example, offset printing is only capable of printing two stable tone values i.e. deposit ink or not. In order to reproduce images having continuous tones, a halftoning or screening technique is used. In the graphic arts environment, halftoning techniques convert density values of tints and images into a geometric distribution of binary dots that can be printed. The eye is not able to see the individual halftone dots, and only sees the corresponding "spatially integrated" density value. In a more general context, halftoning techniques can be seen as methods to convert "low spatial, high tonal resolution information" into an equivalent of "high spatial, low tonal resolution information". (The qualifiers "low" and "high" have to be seen on a relative scale in this context).

Two main classes of halftoning techniques have been described for use in the graphic arts field. These two techniques are known as "amplitude modulation" and "frequency modulation" screening. In amplitude modulation screening the halftone dots, that together give the impression of a particular tone, are arranged on a fixed geometric grid. By varying the size of the halftone dots, the different tones of images can be simulated. Consequently, this technique can also be called "dot-size modulation screening". In frequency modulation screening the distance between the halftone dots is modulated rather then their size, and can also be referred to as "dot-position modulation screening". This technique, although well known in the field of low resolution plain paper printers, has not obtained much attention for offset printing and other high end printing methods, probably because of the disadvantages to be discussed below.

Figure 1A:
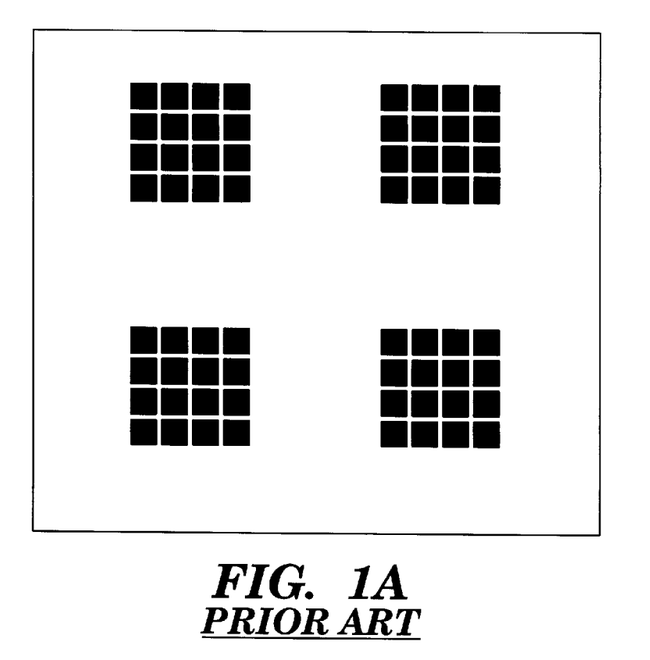
FIGS. 1A and 1B show halftone dot configurations in amplitude- and frequency-modulation halftone screening respectively.
Figure 1B:
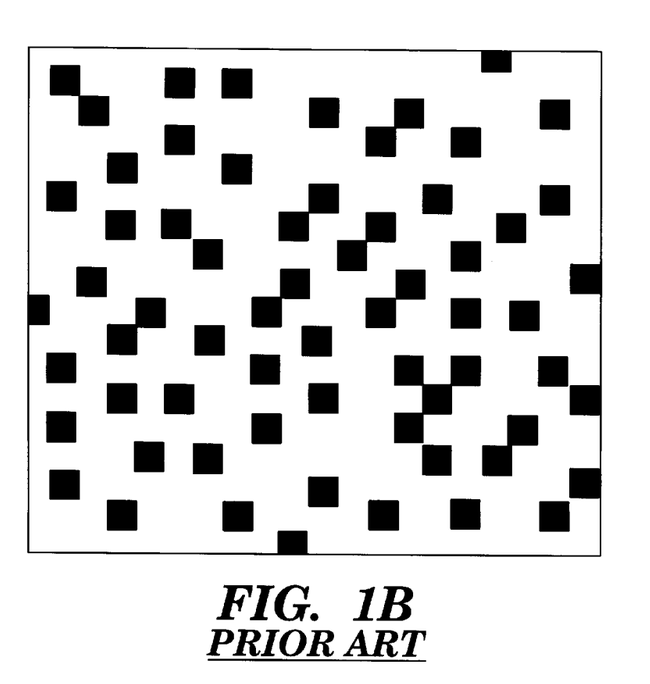

Both classes of halftoning techniques are used in combination with a digital film recorder. A typical digital film recorder employs a scanning laser beam that exposes a photosensitive material at high resolution. The "grid" that defines the resolution at which the laser beam can be switched on or off, usually has an element size in the range of $^{0}/_{1800}$ of an inch. The photosensitive material can be a photographic film from which a printing plate is later prepared by means of photomechanical techniques. The smallest addressable unit on a recorder is often called a "micro dot", "recorder element", or "rel". Its size is referred to as the recorder "pitch". As illustrated in FIG. 1A a dot-size modulated halftone dot is made up of a clustered set of recorder elements, while in FIG. 1B frequency-modulation halftone dots consist of individual recording elements.

The most important characteristics of a screening or halftoning technique for faithfully reproducing continuous tone information include:

1) The image rendering characteristics, more specifically the capability of the technique to render spatial detail in the original image content without the introduction of artifacts such as moiré, textures and noise, as well as the capability to render a full range of tones;
2) The photomechanical characteristics of the halftone dots produced by the method, which determine how consistently halftone dots can be recorded, copied or duplicated in the different steps of the photomechanical preparation of the printing plates; and,
3) The behavior of the halftones on an offset printing press.

The two classes of halftoning techniques, each with some of their variants, will now be reviewed in the light of the above characteristics, and their advantages and disadvantages will be discussed

Amplitude Modulation Screening

Amplitude modulation screening has as its major advantages that it has excellent photomechanical reproduction characteristics, and that, for screens with rulings up to 200 dots/inch, it prints predictably on offset presses. An important disadvantage of amplitude modulation screening, however, is the fact that unwanted patterns can occur within the halftoned image. Depending on their origin, these patterns are called subject moiré, color moiré or internal moiré. Subject moiré results from the geometric interaction between periodic components in the original subject matter and the halftone screen itself. Methods addressing subject moiré are disclosed in e.g. U.S. Pat. No. 5,130,821, EP 369302 and EP 488324. These methods do not, however, completely solve the problem.

Color moiré results from interferences between the halftones of the different color separations of the image. The use of screen angles for the different color separations shifted by 60 degrees with respect to each other has been suggested to address this problem. Several disclosures relate to the problem of generating screens with these angles or close approximations thereof. See for example U.S. Pat. No. 4,419,690, U.S. Pat. No. 4,350,996, U.S. Pat. No. 4,924,301 and U.S. Pat. No. 5,155,599. Other combinations of angles, frequencies or relative phases of the halftone dot patterns for the different color separations have also been used to overcome the same problem, as described for example in U.S. Pat. No. 4,443,060, U.S. Pat. No. 4,537,470 and EP 501,126.

Internal moiré refers to patterns resulting from the geometric interaction of the halftone screen with the addressable grid on which they are rendered. Methods to reduce internal moiré are usually based on the introduction of a random element that breaks up or "diffuses" the phase error that periodically builds up as a consequence of the frequency and angle relation between the halftone screen and the addressable grid on which it is rendered. Examples of such techniques are disclosed in U.S. Pat. No. 4,456,924, U.S. Pat. No. 4,499,489, U.S. Pat. No. 4,700,235, U.S. Pat. No. 4,918,622, U.S. Pat. No. 5,150,428 and WO 90/04898.

Frequency Modulation Screening

None of the variants of the dot-size modulation screening has proven to be successful in completely eliminating the moiré problems and frequency modulation screening techniques have therefore been suggested to further reduce the problem. Various frequency modulation screening techniques have been disclosed and they can be divided into the following subclasses: (1) Point-to-point thresholding based techniques; (2) Error Diffusion techniques (and their variations); and, (3) Special techniques, such as that disclosed in DE 29,31,092, and further developed in U.S. Pat. No. 4,485,397.

The most representative example of point-to-point thresholding is the halftoning based on the "Bayer" dither matrix. See Bayer, B.E., "An Optimum Method for Two-level Rendition of Continuous-tone Pictures", Proc. IEEE International Conference on Communications, Conference Record, pp. (26-11), (26-15), 1973. The Bayer dither matrix has a size that is a power of two, and contains threshold values that are arranged in such a fashion that, when thresholded against increasing levels of density, every halftone dot is "as far away as possible" from the halftone dots that are used to render the lower density levels.

Another point-to-point thresholding technique uses a "blue-noise mask" instead of a Bayer dither matrix. It is described in U.S. Pat. No. 5,111,310. The blue-noise mask is the result of an optimization (filtering) performed iteratively (for the subsequent threshold "layers") between the halftone dot patterns produced by the mask and their Fourier transforms.

The halftone dot patterns produced by the Bayer dither matrix contain strong periodic components, visible as "texture" that can potentially create moiré problems similar to the dot-size modulation algorithms. Because the energy of the periodic dither components is "spread" over the different harmonics, and because most of these harmonics have a relatively high frequency compared to the fundamental frequency of dot-size modulation, the moiré that occurs is less disturbing.

The "Blue-noise mask" threshold matrix produces distributions of halftone dots that are aperiodic. This method is therefore free of the moiré problems that occur with the dot-size modulation methods or with the Bayer dither matrix. The aperiodic character of the halftone dot distributions of the Blue-noise mask technique translates in the frequency domain into a "continuous" power spectrum. This suggests that at least some energy is also present in the very low frequency bands of the spectrum. This energy at low (visible) spatial frequencies is one of the reasons why tints rendered with the blue-noise mask technique can appear grainy. The relation between "graininess" introduced by frequency-modulation halftoning methods and the shape of the frequency spectrum is extensively discussed by Ulichney Robert, "Digital Halftoning", MIT Press Cambridge Massachusetts, 1987, ISBN 0-262-21009-6.

Perhaps the best known of all "frequency modulation" techniques is the error diffusion algorithm. It comes in many variations, but the principle is always the same: the error that occurs as a result of the binarization (or, in a more general context, the quantization) of the image data during the rendering is "diffused" to one or more of the unprocessed pixels. Best known is the Floyd and Steinberg algorithm (Floyd, R. W., and L. Steinberg, "An Adaptive Algorithm for Spatial Greyscale", Proc. SID, vol. 17/2, pp. 75–77). However many variations exist that usually differ in the order in which pixel halftoning is done, in how the error is diffused (to how many pixels and with which weights), or in how a random element is introduced in the algorithm to break up the unwanted patterning that can occur with some of them.

All of the frequency-modulation halftoning techniques that produce aperiodic halftone dot distributions share the advantage that they are much less sensitive to the problems of moiré than the "dot-size modulation" techniques. Unfortunately, they also share the disadvantages of poor photomechanical behavior and a high tone gain on the press.

The Physical Reconstruction Function

The photomechanical properties of a film on which a halftone pattern is recorded depend to a great extent on the interaction between the "layout" of that halftone dot pattern and the imaging characteristics of the device on which it is rendered, hereinafter referred to as the "physical reconstruction function" of the rendering device. An exact mathematical description of these interactions is complicated because of their non-linear nature. It is usually possible, however, to make simplifications that produce at least qualitative results, or to apply numerical simulation techniques when more precise predictions are needed.

Figure 2:
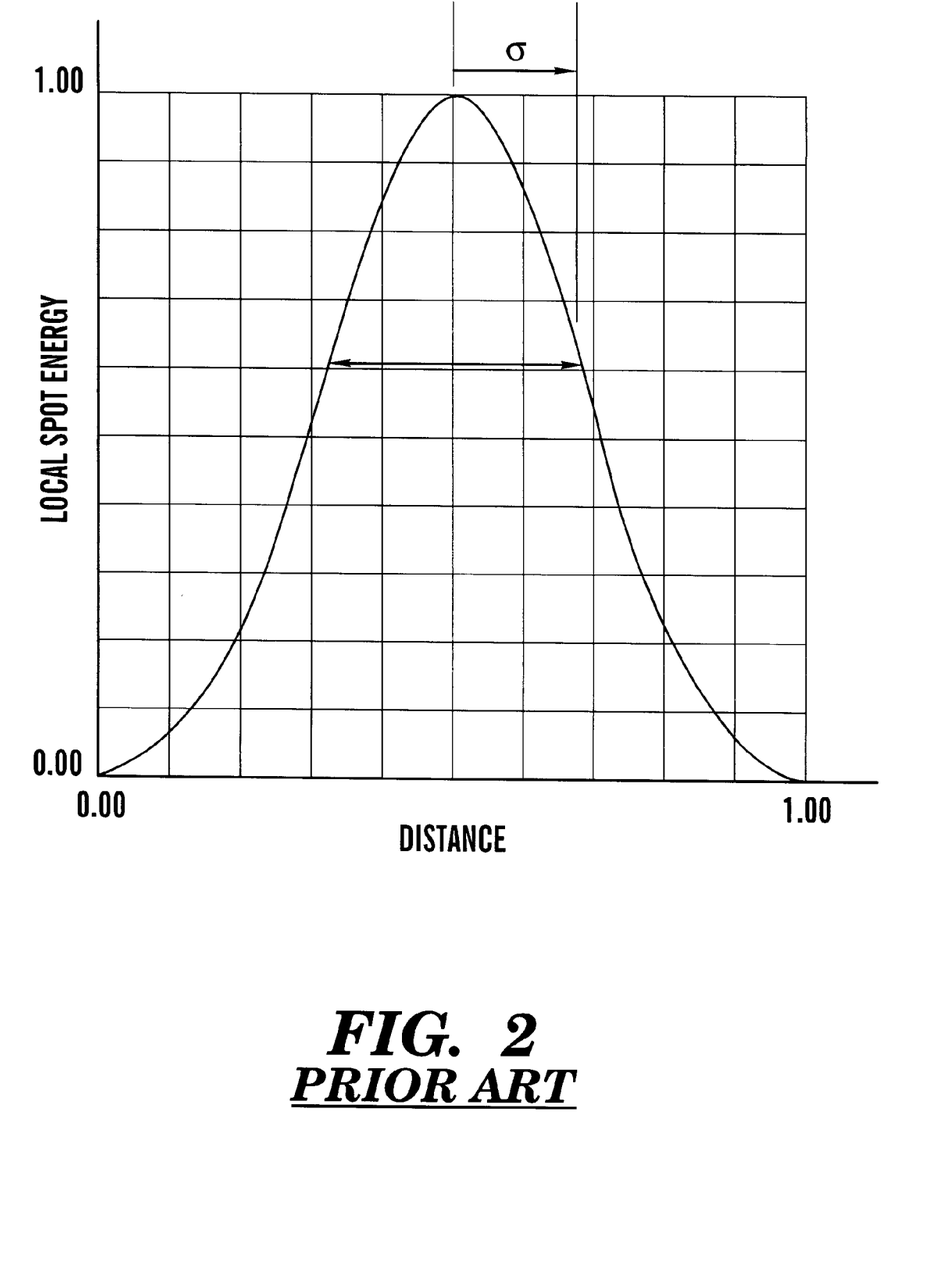
FIG. 2 shows a one-dimensional representation of the Gaussian profile of the energy distribution of a laser spot.

The above approaches can be applied to a rendering device such as a laser recorder in combination with film. The physical reconstruction function of a laser recorder/film system is largely the result of: (1) the spatial energy distribution of the laser spot in the recorder, and, (2) the developing characteristics of the film/processing system. The "profile" of the spatial distribution of the energy of a laser spot is usually approximately Gaussian. FIG. 2 shows a one-dimensional representation of energy as a function of distance from the center of the spot. A "spot width" can be associated with this profile, measured at the inflection points of the distribution (equaling two times the sigma of the Gaussian curve). A real scanning laser spot should of course be described two-dimensionally, i.e., in terms of the direction parallel to the scanning beam, hereinafter referred to as the "fast-scan direction", and that perpendicular to the scanning beam, hereinafter referred to as the "cross-scan direction". The laser spot energy distribution is determined in each direction by the intensity of the beam profile in that direction. In the "fast-scan direction", however, the exact profile is additionally affected by the transient on/off modulation of the laser beam.

Figure 3:
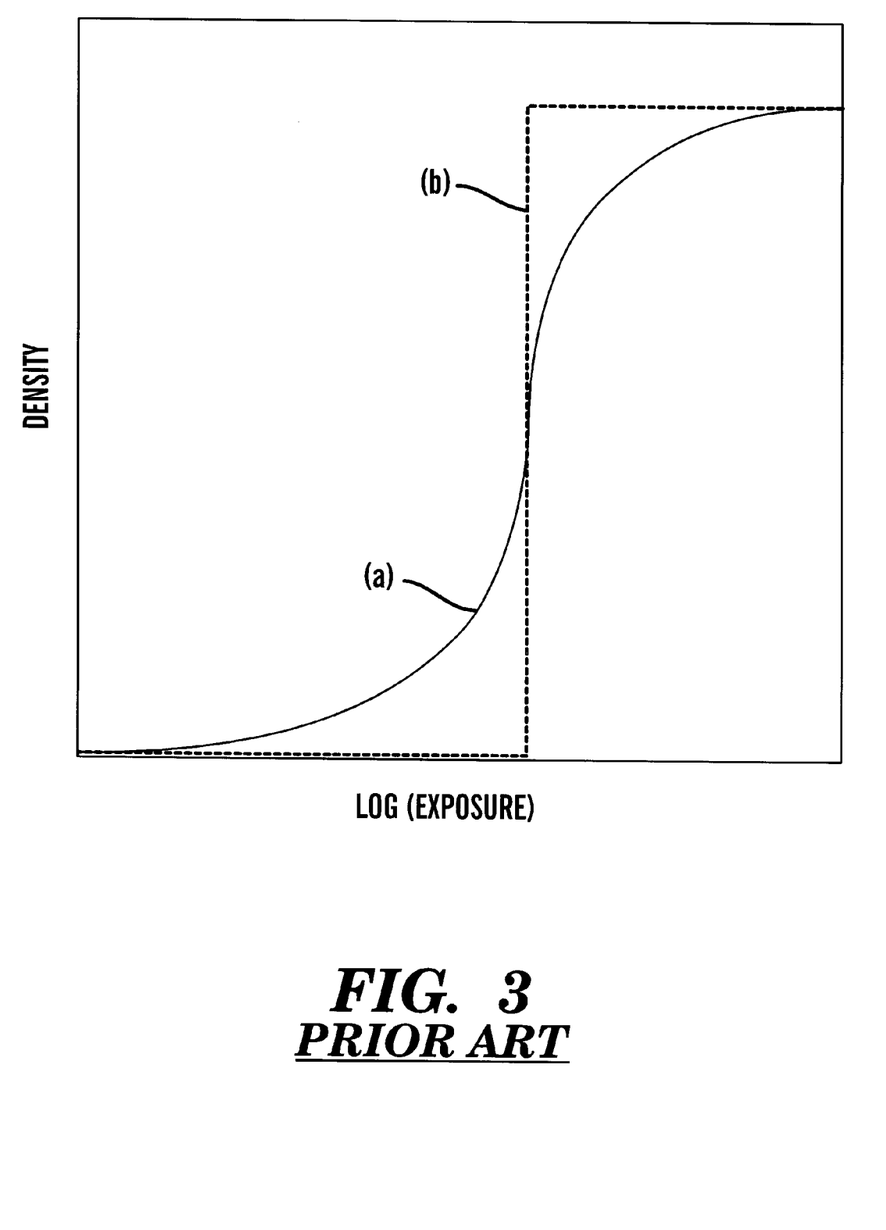
FIG. 3 shows the developing characteristics of a typical film/processing system.

The developing characteristics of a typical film/processing system are shown in FIG. 3. Curve (a) shows an example of a real film/processing system, while curve (b) shows the "ideal" equivalent, corresponding to a thresholding operation: if the total exposure exceeds a certain level, the local density on the film is high, otherwise it is low. The physical reconstruction function itself is obtained by combining the energy distribution of the scanning laser beam with the overall developing characteristics of the film/processing system.

Given that the laser film recorder has an addressable recording grid with a pitch P, it is possible to determine an optimal spot geometry for the exposing laser beam. A criterion that is often used is that every black rel, whether it occurs in a disconnected or clustered configuration should be rendered on the film as a square with a size that is exactly equal to the recorder pitch P, and with a microscopic density that exceeds a certain minimum value. In other words, it is expected that every rel is always rendered such that no gain or loss in size, in neither the fast-scan or the cross-scan direction occurs.

Figure 4A:
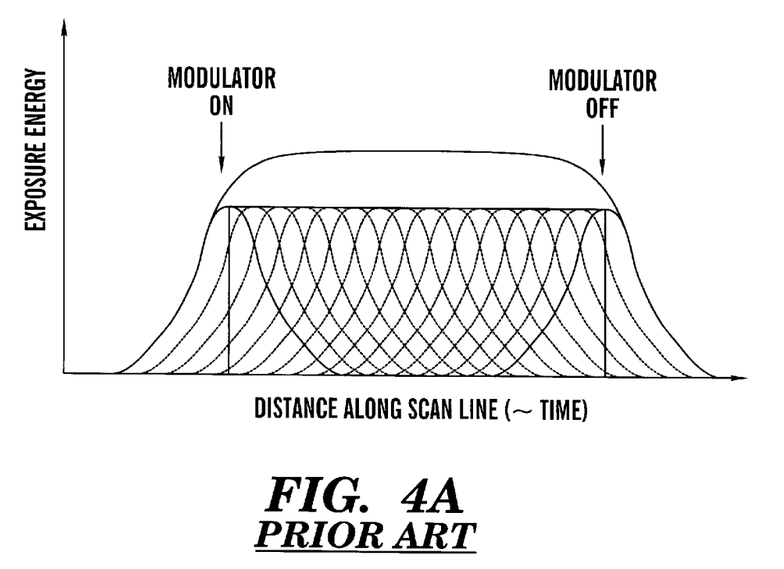
FIGS. 4A and 4B compare the way in which the energy of a scanning laser beam adds up in the fast- and cross-scan directions respectively.
Figure 4B:
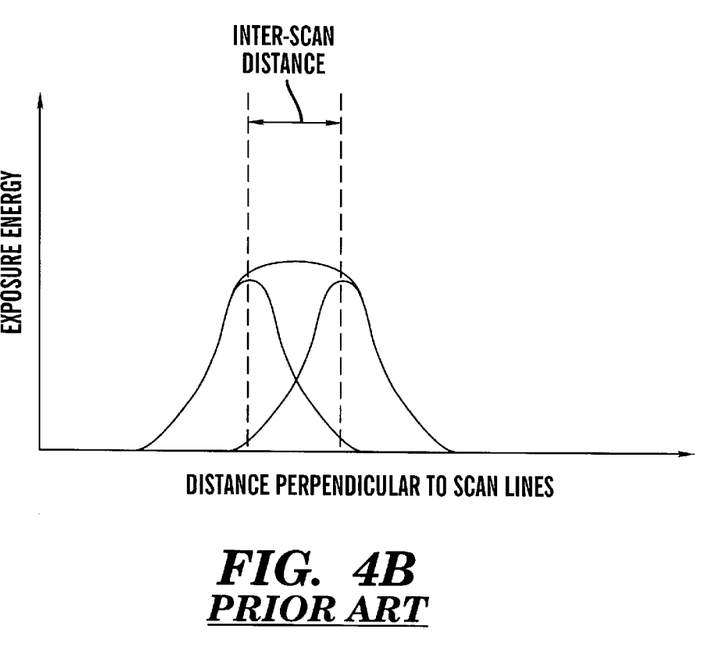

FIG. 4A and FIG. 4B show that the way that the energy of a scanning laser beam adds up in the fast-scan versus the cross-scan direction is different. In the fast scan direction, the process resembles a convolution of the energy distribution of the beam in that direction, with the transmission characteristics of the on/off modulation of the laser beam. In the cross-scan direction, however, the energies of neighboring scan lines are simply added together. This difference makes it necessary to carry out a separate analysis in each dimension in order to find out how the requirement of "zero dot gain" translates to a desired spot geometry. This will be done from the viewpoint of frequency-modulation halftoning, in which one individual halftone dot actually corresponds to one rel.

Figure 5A:
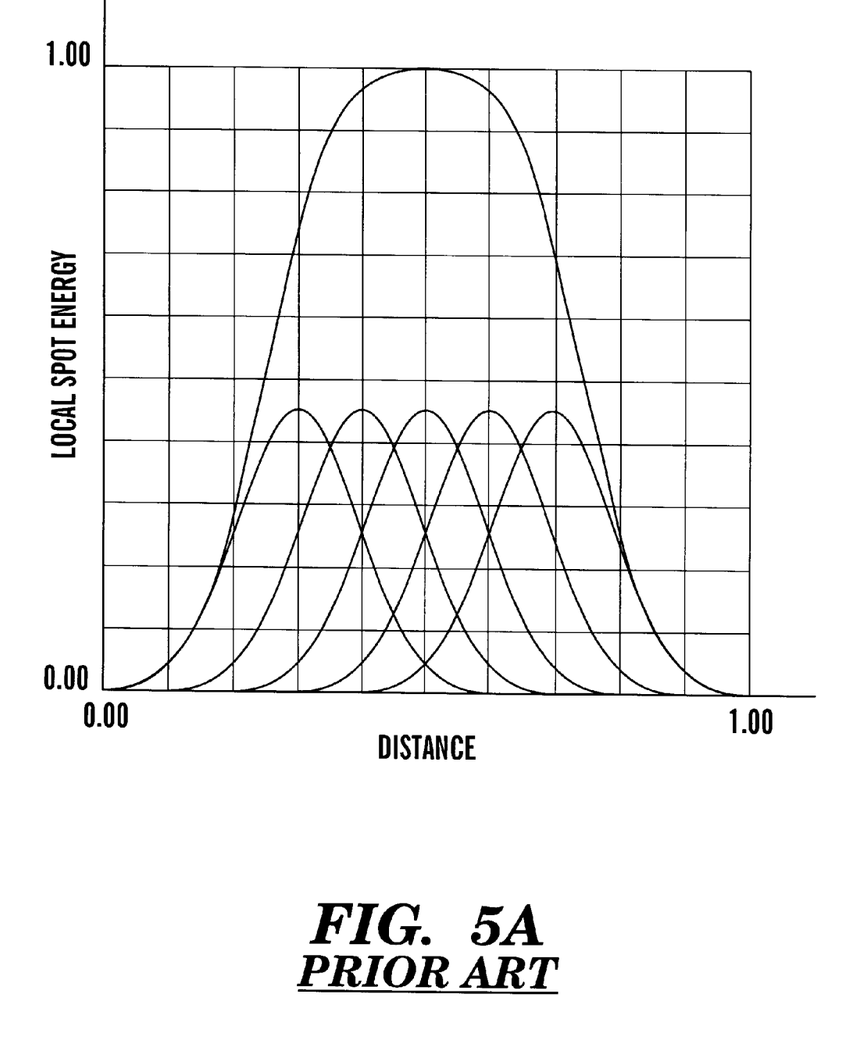
FIGS. 5A, 5B and 5C illustrate the effect of combining individual Gaussian curves representing individual recording elements of varying size in the cross-scan direction.
Figure 5B:
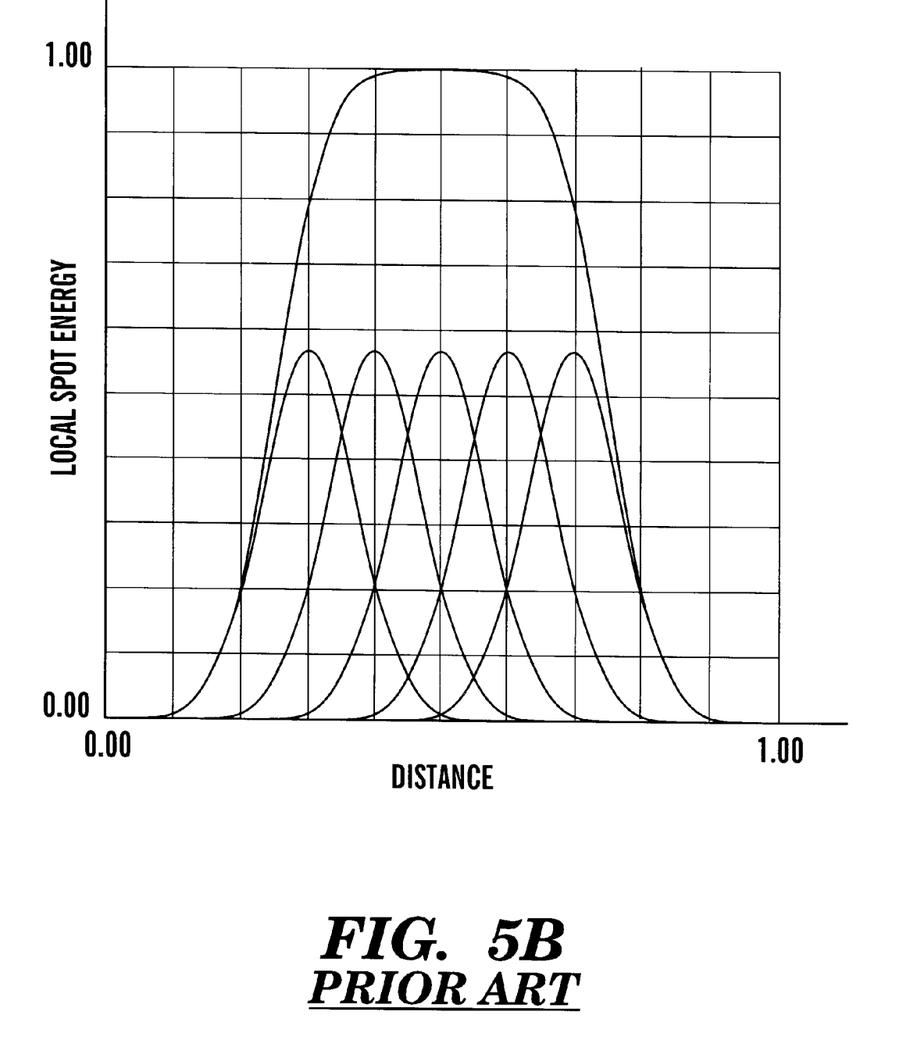
Figure 5C:
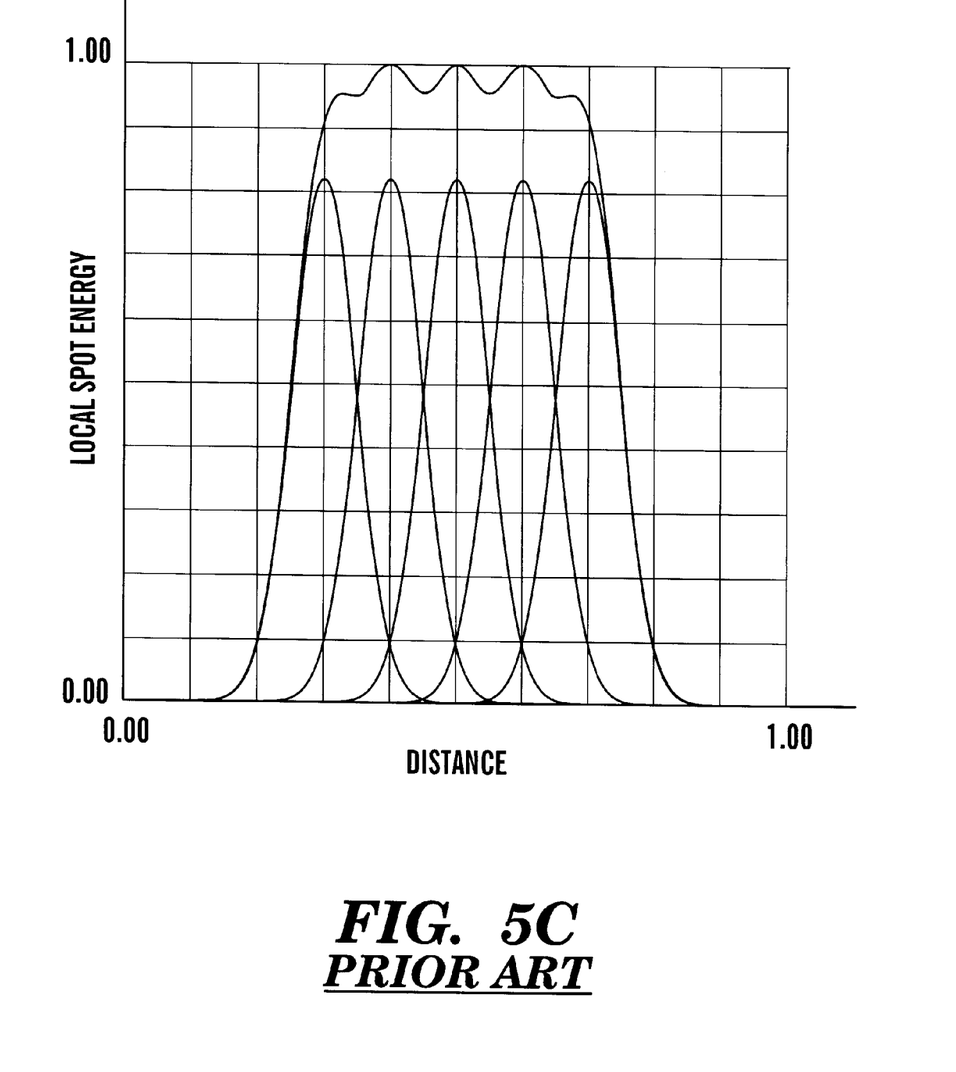

FIG. 5A, FIG. 5B and FIG. 5C illustrate what happens if the energies of five individual laser spots are added together in the cross-scan direction for three different spot widths. One unit on the x-direction scale corresponds with one unit of recorder pitch.

The spot in figure FIG. 5A is broad in comparison to the recorder pitch, when measured at the inflection points of the Gaussian curve. This spot geometry requires the use of a film with a steep gradation curve in order to obtain a "hard" dot on the film, as opposed to a dot that reflects the "soft" edges of the energy profile of the exposing laser beam. In order to obtain disconnected halftone dots with a size in the cross-scan direction exactly equal to one recording pitch, the developing threshold must be placed approximately below the 0.4 value on the y-axis of figure FIG. 5A. As the same figure demonstrates, however, placing the developing threshold at this point still results in a gain in size in the cross-scan direction, called "recorder gain", for a set of clustered halftone dots. This leads to the conclusion that, with the spot geometry in FIG. 5A, it is impossible to find a level for the developing threshold that produces zero gain for individual halftone dots and for clustered halftone dots at the same time. Because of this, the spot geometry of FIG. 5A should be considered less than desirable. Another reason why it is to be avoided is that the size of the rendering of individual halftone dots is highly affected by changes in the position of the developing threshold. In other words, a system with the spot geometry of FIG. 5A has a very limited latitude for changes in exposure and developing conditions.

A second spot geometry is presented in FIG. 5B. The spot width in this case has been made exactly equal to 2×sqrt(2.0) times the recorder pitch. A particularity of this geometry is that the profile of the sum of the energies of the laser spots approximates a flat line. The other characteristics are comparable to what was described for the geometry in FIG. 5A.

The third spot geometry in FIG. 5C comes close to the ideal situation. The spot width is narrow in this case, and hardly exceeds one recorder pitch. In order to make the size of an individual halftone dot exactly equal to one recorder pitch, the developing threshold should be placed at the level where the curves of the individual spot energies cross each other (0.46 on the y scale of FIG. 5C). Unlike the previous cases, the drawing shows that there is no additional gain in size when more rels are clustered in the cross-scan direction, and that the developing threshold can vary within a reasonable range without appreciably changing the size of the dots. The steep edges of the energy profiles of both the disconnected and clustered halftone dots also produce "hard" dots on the film without requiring a film with a high contrast (i.e., gradation). In conclusion, an ideal spot geometry is achievable in the cross-scan direction, and has the form shown in FIG. 5C.

The situation is different in the fast-scan direction. Even if it is assumed that the bandwidth of the beam on/off modulator is infinite, it is still necessary to have an infinitesimally narrow Gaussian spot geometry in order to have no gain in dot size in the fast-scan direction. For practical reasons, however, the optics of real laser recorder systems do not permit reduction of the spot size in the fast-scan direction more than by a factor of two or three compared to the spot size in the cross-scan direction. This explains why the spot geometry in the fast-scan direction is inevitably less than ideal, and why there is in general gain in the fast-scan direction.

In an attempt to reduce the overall dot gain (in both dimensions), the optics of laser recorders are sometimes designed so that the recorder gain in the fast-scan direction is offset by a recorder loss in the cross-scan direction.

Figure 6A:
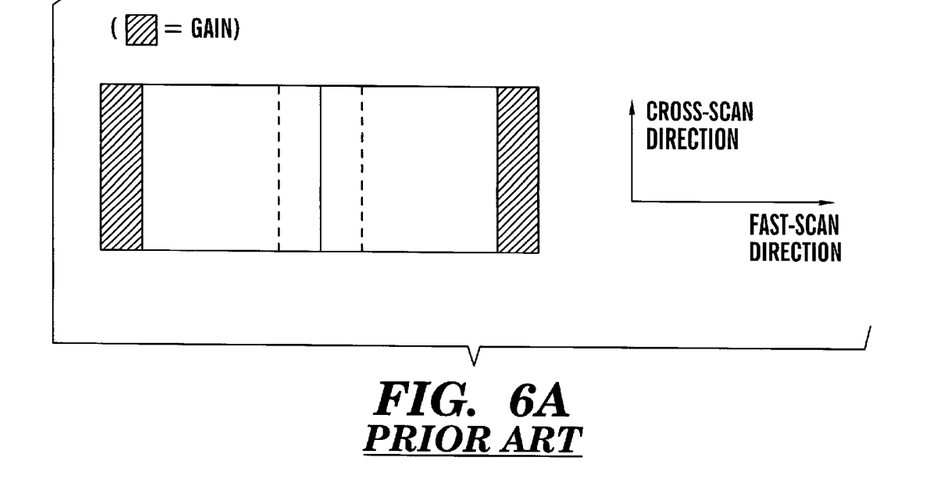
FIGS. 6A and 6B illustrate the net dot gain and loss effects occurring with dots lined up along the fast- and cross-scan directions respectively.
Figure 6B:
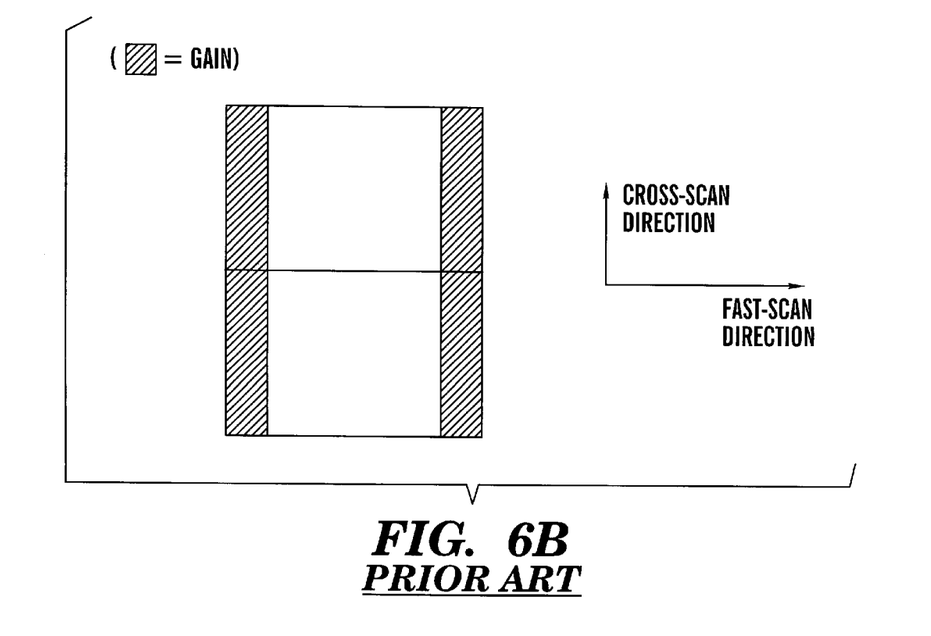

As the above considerations demonstrate, recorder gain is a problem of a fundamental nature. In the case of "dot-size modulation" techniques, it is responsible for a change in size of the halftone dots that are recorded on the film. In the case of frequency modulation, however, there is another effect. This is the increased level of graininess in the rendered halftone. FIG. 6A and FIG. 6B show two frequency-modulation halftone dots that are lined up in the fast-scan direction and the cross-scan direction. It is clear from the figures that the total amount of gain is twice as large if the dots are placed in the cross-scan direction. This example shows that, at the microscopic scale of the dot layout, the amount of recorder gain can vary locally. Since most frequency-modulation halftoning algorithms produce randomized distributions of halftone dots, this effect results in the addition of a random amount of local recorder gain, which appears to the eye as an increased level of graininess.

Figure 7A:
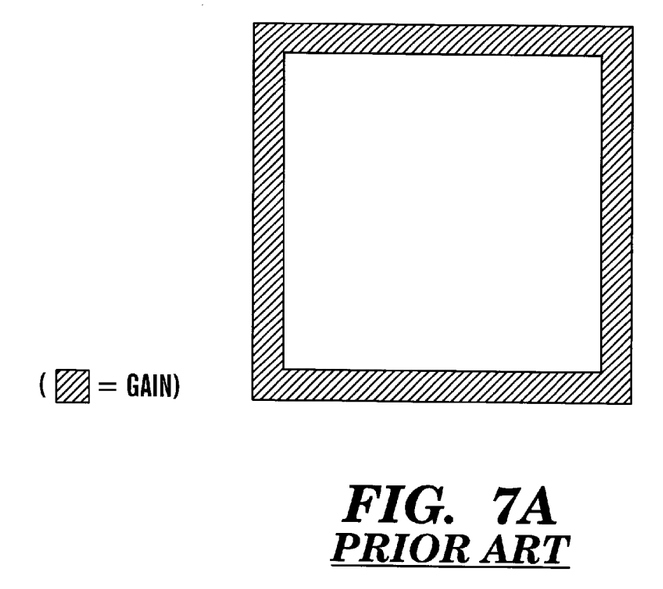
FIGS. 7A and 7B compare dot gain resulting from replication of small dots with that of a single dot having the same total area.
Figure 7B:
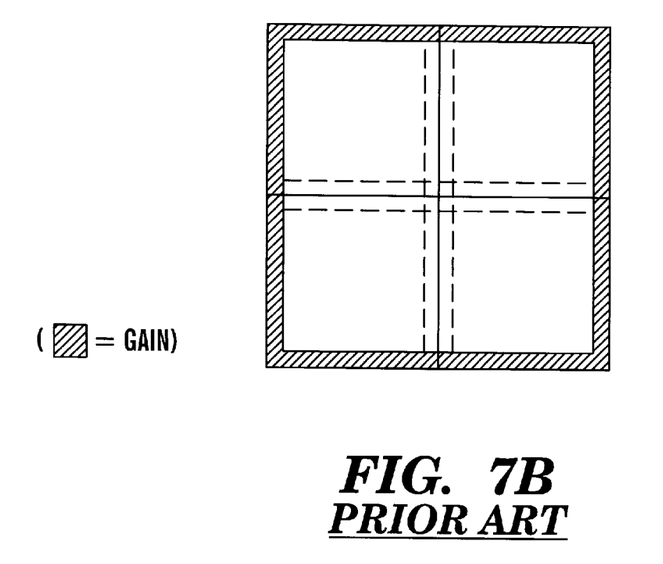

One method for reducing the problems created by recorder gain in frequency-modulation halftoning is pixel replication, i.e., the combination of pixels rendered at the fundamental recorder pitch into effectively larger pixels by replication. The fact that the total gain in dot size is smaller when the halftone dots are rendered using a matrix of smaller recording elements is illustrated in FIG. 7A and FIG. 7B: the change in dot size due to the non-ideal shape of the physical reconstruction function is N times smaller in FIG. 7B than it is in FIG. 7A. From this follows immediately that adverse effects caused by dot gain, such as the non uniformity of dot size, are reduced accordingly.

Dot replication has been used commercially in the "COBRA" raster image processor of Miles Inc., Agfa Division. In this product, the frequency-modulation halftone dots are replicated twice horizontally and vertically, and then output on a laser film recorder that is operated at twice the resolution of the raster image processor. In doing so, a spot is used that is twice as small, and this results in half of the recorder gain, and in a reduction of the graininess that is superimposed on the frequency-modulation halftone.

Figure 8:
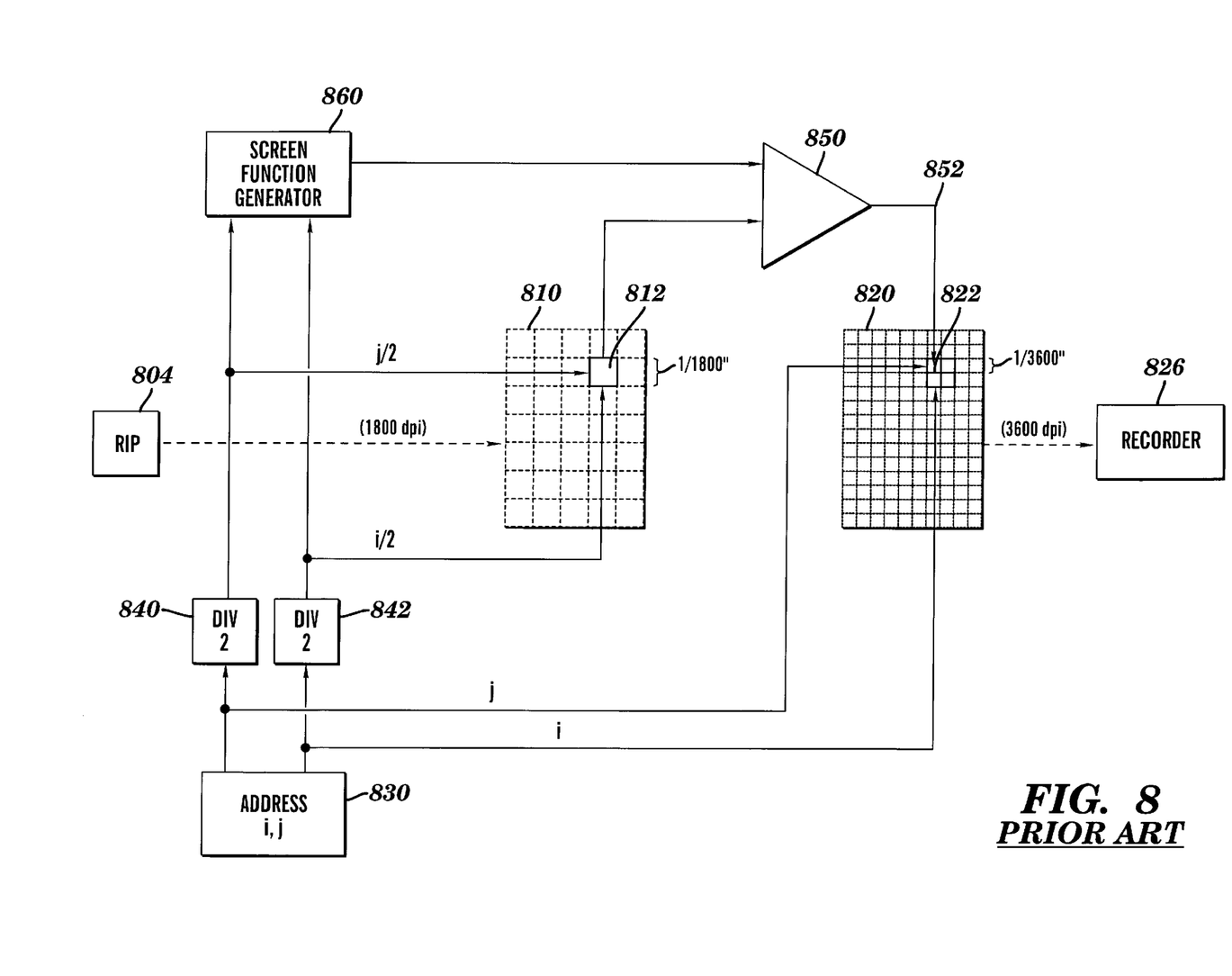
FIG. 8 shows a block diagram of a prior-art method of dot-gain reduction by means of dot replication; and, FIG. 9 is a system-level block diagram of the processing steps employed by the invention.

FIG. 8 shows a block diagram of the circuit used to implement the dot replication method equivalent to that used in the COBRA product. Block 810 is a memory store containing the original contone pixel values organized as N by M rows and columns. These values are represented with an 8 bits. Block 820 is another memory store, which has exactly twice the number of rows and columns as block 810 and in which the halftoned pixel values are stored. The address-generator 830 sequentially generates all the address values (i, j) for the store 820. Block 840 and 842 are address-scaling units which cause the halftone pixel values coming from comparator 850 to be replicated four times in the store 820.

Block 860 is a screen function generator that generates a frequency-modulation ("stochastic") screen function. In the comparator 850, the screen function values from the screen function generator 860 are compared with the pixel values from the memory store 810. Depending on the outcome of this comparison, a 0 or 1 value is stored in the corresponding (replicated) locations of store 820.

The scheme in FIG. 8 has proven to be effective in reducing recorder gain and the graininess that results from it, but has the disadvantage that text, graphics and boundary information in general are rendered at a resolution that is only half the resolution of the laser film recorder.

The use of multiple pitches for rendering of halftones and other page elements, on the other hand, is old in the art. See for example, U.S. Pat. No. 4,004,079 in which a "high" resolution is used for processing and rendering of text and graphics, while a "low" resolution is used for continuous tone data. This technique is aimed at reducing the total data processing requirement, however, and has no effect upon the size of halftone dots, nor, more specifically, does it address the problem of recorder gain and graininess.

In conclusion, prior art methods which are effective in reducing the recorder gain and graininess encountered in frequency-modulation halftoning techniques, such as dot replication, fail to realize the full resolution required for text and graphics, while the use of dual resolution methods, such as that of the cited patent, provide maximum resolution for text and graphics without reducing recorder gain or graininess.

It is accordingly a general object of the invention to provide an improved frequency-modulation halftone screen and method for frequency-modulation halftoning yielding desirable reprographic characteristics in combination with high resolution rendering of text, graphics, and boundary information in general.

It is a specific object of the invention to provide a halftone screen having halftone dots which are large enough to have desirable reprographic characteristics.

It is a further specific object of the invention to provide a halftone screen in which text, graphics and boundary information in general are rendered at the full resolution of the output recording device.

SUMMARY OF THE INVENTION

The invention may be summarized as an improved frequency-modulation halftone screen and method that enables the use of relatively large frequency-modulation halftone dots, having desirable reprographic characteristics, in combination with high resolution rendering of text, graphics, and boundary information in general. As an aid to understanding the discussion to follow, the terms defined herein apply to the entire specification and claims, and are indicated by small capitalization. The term RECORDER PITCH is defined as the smallest spatial subdivision of the two-dimensional grid used for output rendering, i.e., corresponding to the resolution of the output device. The value of the RECORDER PITCH can be the same or different for the horizontal and vertical dimensions. A CONTONE IMAGE is either an explicit (previously generated) or implicit (generated on the fly) digital data representation of a continuous-tone image, comprising a matrix of elements whose size in each dimension is equal to the RECORDER PITCH value for that dimension, such that each element may take on a tone value defined on a continuous range (e.g., from 0 to 255). A CONTONE DATA VALUE is one element of a CONTONE IMAGE. A HALFTONE IMAGE is a matrix of elements defined at the RECORDER PITCH containing the data as it will be used to drive the recording device. A HALFTONE DATA VALUE is one element of a HALFTONE IMAGE. A HALFTONE REGION is a connected region of a CONTONE IMAGE in which the CONTONE DATA VALUES are everywhere the same.

The term FREQUENCY-MODULATION HALFTONING shall mean any halftoning technique in which:
1. the average distance of the HALFTONE DOTS changes as a function of the tone value; or
2. the number of resulting halftone dots per unit area varies with the tone value; or
3. the size of the resulting halftone dots, in addition to the number of resulting halftone dots per unit area, varies with the tone value; or
4. the microscopic density of the resulting halftone dots, in addition to their size and/or number of resulting halftone dots per unit area, varies with the tone value; or
5. any halftoning technique where the centers of the resulting halftone dots are not laid out on a periodic grid.

The term FREQUENCY-MODULATION HALFTONE IMAGE shall mean a HALFTONE IMAGE generated by the process of FREQUENCY-MODULATION HALFTONING. A HALFTONE DOT is a single halftone dot resulting from the process of FREQUENCY-MODULATION HALFTONING. The term THRESHOLD VALUE shall mean a value which is used in FREQUENCY-MODULATION HALFTONING for comparison with a CONTONE DATA VALUE with the result of this comparison yielding a HALFTONE DATA VALUE.

In terms of the above definitions, therefore, HALFTONE DOTS which fall entirely within a single HALFTONE REGION are rendered as a cluster of equal HALFTONE DATA VALUES. HALFTONE DOTS which overlap adjacent HALFTONE REGIONS, however, are allowed to be rendered as clusters made up of different HALFTONE DATA VALUES. By building every HALFTONE DOT as a cluster of the smaller (equal) HALFTONE DATA VALUES, the total gain in dot size can be reduced, along with the negative effects resulting from dot gain, e.g., graininess, as previously illustrated in FIG. 7A and FIG. 7B. Allowing HALFTONE DATA VALUES with distinct HALFTONE DATA VALUES permits rendering of boundary information at the RECORDER PITCH. This results in a corresponding improvement in the quality of text and graphics.

The method differs from the prior art approaches described previously in that only a single resolution is used for the rendering of all elements, i.e., that corresponding to the RECORDER PITCH, thereby achieving the highest possible resolution for text and graphics. An essential distinction between the dot replication method described for the COBRA product and illustrated in FIG. 8 and the method of the invention is that the latter permits HALFTONE DOTS to be rendered with distinct HALFTONE DATA VALUES.

BRIEF DESCRIPTION OF THE DRAWINGS

The invention will be best understood from a detailed description of a preferred embodiment thereof, selected for purposes of illustration, and presented with reference to the accompanying drawings, in which.

DETAILED DESCRIPTION OF A PREFERRED EMBODIMENT OF THE INVENTION

Figure 9:
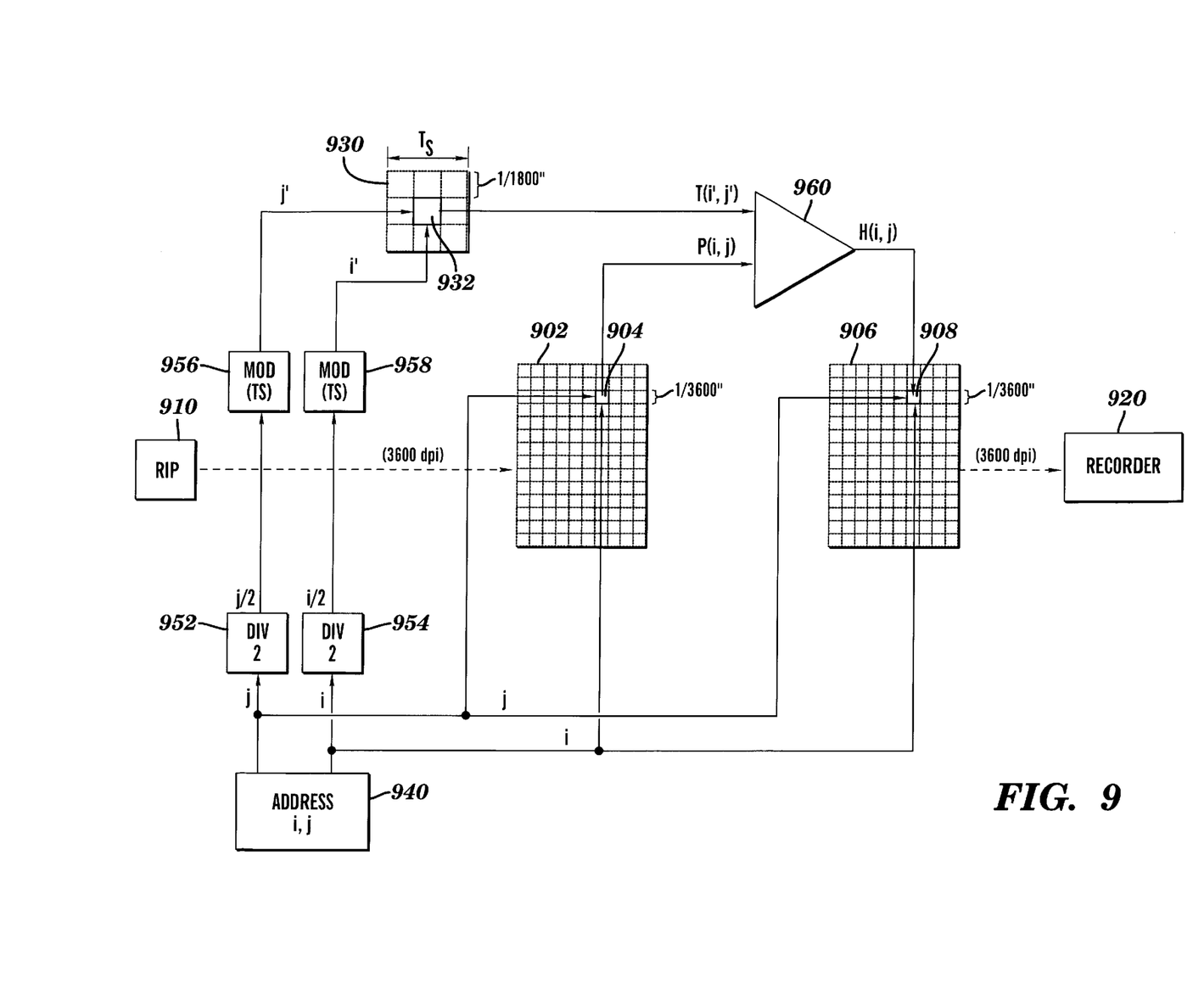

Turning now to the drawings, the processing steps which can be used with the invention are shown in FIG. 9. In the figure, a first memory store 902 contains a CONTONE IMAGE, made up of a rectangular array of CONTONE DATA VALUES 904 (usually represented with 8 bits), stored in N rows by M columns. A second, or output, memory store 906 contains the HALFTONE MAGE, made up of HALF-TONE DATA VALUES 908 (usually represented by a single bit), also organized as a rectangular array of N rows by M columns. Block 910 is a raster image processor ("RIP"), such as that offered by Adobe Systems, Inc., which generates raster images from a page description in the POSTSCRIPT language (a trademark of Adobe Systems). The raster images generated by the RIP 910 are stored as the CONTONE DATA VALUES in memory block 902. Block 920 is a high-quality laser recording device to record the information in memory block 906 onto film. The resolution of this device can for example be 3600 dots per inch (corresponding to a RECORDER PITCH of 1/3600 inch). A suitable device is the SELECTSET 5000 recorder sold by Miles Inc., Agfa Division.

Block 930 is a memory store containing a square matrix with $T_S$ by $T_S$ THRESHOLD VALUES 932 organized as $T_S$ rows and $T_S$ columns. The THRESHOLD VALUES 932 have the same range of data value as the CONTONE DATA VALUES in the memory store 902. The dimension $T_S$ can be any value, but is usually taken to be a power of 2 (e.g., 1024) for computation efficiency.

An address generator 940 sequentially generates the N×M coordinate pairs (i, j) addressing individual CONTONE DATA VALUES P(i, j) 904 and individual HALFTONE DATA VALUES H(i, j) 908 of the output memory store 906. Blocks 952 and 954 are arithmetic units which transform the coordinate pairs (i,j) into corresponding coordinate pairs (i/2, j/2) by integer division (DIV) in which i/2=i DIV 2 and J/2–j DIV 2. Blocks 956 and 958 are arithmetic units which transform the coordinate pairs (i/2, j/2) into corresponding coordinate pairs (i', j') in which i'=modulo (i/2, $T_S$) and j'=modulo (j/2, $T_S$). In case the value of $T_S$ is a power of 2, e.g. $2^m$, this modulo operation can be accomplished by using the m least significant bits of the coordinate pair values i/2 and j/2.

Block 960 is a comparator which generates as output 908 a binary HALFTONE DATA VALUE H(i, j) that is dependent on the comparison between T(i', j') and P(i, j). These HALFTONE DATA VALUES are conventionally referred to as "black" when P(i, j) is greater than T(i', j'), and "white" otherwise.

The elements T(i', j') 932 of the THRESHOLD VALUE matrix in block 930 can be calculated following steps which are well known in the art (see for example U.S. Pat. No. 5,111,310). As a result of the division in blocks 952 and 954, each elemental THRESHOLD VALUE 932 is replicated twice in each dimension. It is this replication which causes the HALFTONE DOTS to have a size that is twice as large as the RECORDER PITCH.

Operation of the circuit of FIG. 9 is now described for two cases: a flat tint, and a black-to-white transition. In the case of a flat tint, every HALFTONE DOT is rendered as a matrix of 2×2 HALFTONE DATA VALUES, since it is compared to a THRESHOLD VALUE which has been replicated twice times horizontally and vertically.

In the case of a HALFTONE DOT crossed by a tone transition, the dot is divided into two areas: the area covering the part of the image with the first CONTONE DATA VALUE, and the part of the image covering the second CONTONE DATA VALUE. If the first CONTONE DATA VALUE exceeds the THRESHOLD VALUE used for all elements of cluster corresponding to the HALFTONE DOT, the result is "black" HALFTONE DATA VALUES. If at the same time the second CONTONE DATA VALUE is lower than the corresponding THRESHOLD VALUE, the result is "white" HALFTONE DATA VALUES. It is therefore possible for boundary information to be rendered at the RECORDER PITCH, which is different from the size of the HALFTONE DOT.

It will be clear to one skilled in the art that the functions of the circuit of FIG. 9 can be implemented by alternative hardware and/or software components. For example, one implementation makes use of the features of the POST-SCRIPT language, by downloading pre-calculated screen descriptions as "threshold matrices" to the POSTSCRIPT RIP. As in the method shown in FIG. 9, these threshold matrices are effectively replicated horizontally and vertically to obtain a THRESHOLD VALUE for every position on the addressable grid of the recorder. Instead of sub-dividing the coordinate values (i, j) which address the screen function, however, THRESHOLD VALUE replication is achieved by creating a new threshold matrix containing K times as many rows and columns as the original threshold matrix, and in which every THRESHOLD VALUE of the original matrix is replicated K times horizontally and vertically. The new threshold matrix is then downloaded to the POSTSCRIPT RIP instead of the original threshold matrix. This method eliminates the requirement for the address arithmetic, replacing it with the requirement for K×K times more memory to store the replicated THRESHOLD VALUES.

Having described in detail preferred embodiments of our invention, it will now be apparent to those skilled in the art that numerous modifications can be made therein without departing from the scope of the invention as defined in the following claims.

What we claim is:

1. A method for recording a FREQUENCY-MODULATION HALFTONE IMAGE using a recorder, said method comprising the following steps:
   (A) rendering a CONTONE IMAGE at a RECORDER RESOLUTION;
   (B) storing said CONTONE IMAGE as CONTONE DATA VALUES in a first memory store;
   (C) generating THRESHOLD VALUES at a resolution which is different from said RECORDER RESOLUTION;
   (D) converting the resolution of said THRESHOLD VALUES to said RECORDER RESOLUTION;
   (E) comparing each of the CONTONE DATA VALUES of said first memory store in sequence with a corresponding THRESHOLD VALUE;
   (F) storing the result of said comparison as a HALFTONE DATA VALUE in a second memory store, constituting the FREQUENCY-MODULATION HALFTONE IMAGE; and,
   (G) recording the HALFTONE IMAGE on a photosensitive material using the recorder.

2. A method for recording a FREQUENCY-MODULATION HALFTONE IMAGE using a recorder, said method comprising the steps of:

(A) rendering a CONTONE IMAGE at a RECORDER RESOLUTION;
(B) storing said CONTONE IMAGE as CONTONE DATA VALUES in a first memory store;
(C) generating THRESHOLD VALUES at a resolution which is different from said RECORDER RESOLUTION;
(D) converting said resolution of said THRESHOLD VALUES to said RECORDER RESOLUTION;
(E) storing said converted THRESHOLD VALUES in a matrix;
(F) comparing each of the CONTONE DATA VALUES of said first memory store in sequence with corresponding THRESHOLD VALUES in said matrix;
(G) storing the result of said comparison as a HALFTONE DATA VALUE in a second memory store, constituting the FREQUENCY-MODULATION HALFTONE IMAGE; and,
(H) recording the HALFTONE IMAGE on a photosensitive material using the recorder.

* * * * *